Jan. 14, 1964  A. ARBER  3,118,101
AUTOMATIC POLARITY CHANGER FOR BATTERY CHARGING SYSTEMS
Filed Dec. 14, 1961

INVENTOR.
AMIHADAR ARBER
BY
ATTYS.

United States Patent Office 3,118,101
Patented Jan. 14, 1964

3,118,101
AUTOMATIC POLARITY CHANGER FOR
BATTERY CHARGING SYSTEMS
Amihadar Arber, Skokie, Ill., assignor to Electrotone
Laboratories, Inc., Chicago, Ill., a corporation of
Illinois
Filed Dec. 14, 1961, Ser. No. 159,286
9 Claims. (Cl. 320—26)

This invention relates generally to systems for charging batteries and more particularly, relates to a novel automatic polarity changer for use with battery charging systems to obtain proper current supply to a storage battery from the source of charging current regardless of whether the battery terminals are connected to the charger terminals in the correct polarity or not.

Although a preferred embodiment of the invention has been described and illustrated with reference to charging of storage batteries, such as used in automobiles, it should be appreciated that the invention can be used successfully, either with or without suitable adaptations, for charging other types of batteries, as well. In recharging storage batteries, alternating current from a conventional A.C. source, such as a wall outlet, can be rectified by means of a full-wave or other types of rectification and passed through the battery as direct charging current. However, it is essential that the charging current be supplied through the cells of the battery in the proper direction or polarity, that is to say, the positive terminal of the charging equipment must be connected to the positive terminal of the battery or else a condition of reversed polarity results with accompanying damage not only to the battery, but perhaps even more important, to the rectifiers of the charging equipment. This is also especially critical in connection with charging apparatus using alternator systems. This latter occurrence is attributable to the resulting instantaneous, relatively high amperage current discharged by the battery into the battery charging equipment.

Storage battery charging equipment is widely used in garages, filling stations, repair shops, parking lots and elsewhere and even in such relatively more experienced establishments, careless or unskilled or inexperienced personnel are known to connect battery terminals to charger terminals incorrectly with resulting damage to the battery and/or the battery charging equipment. However, more recently, there have been available types of portable battery chargers designed for so-called home use for both six and twelve volt batteries, such as used in automobiles. Such home type battery chargers employ conventional rectifiers and are designed to permit various rates of charging by proper switch selection. These chargers have become increasingly popular and in great demand as a result of the great number of automobiles on the nation's highways and the increasing number of sports car and antique car enthusiasts, as well who service their own vehicles. Such persons are relatively unskilled mechanics and have been more prone to connect the battery to the charger improperly with resulting damage of the charger.

Various attempts have heretofore been made to provide a device or system which seeks to prevent improper connection of the battery to the charger or which breaks the circuit in order to protect the battery and charger in the event of reversed polarity connection thereof or which incorporates polarity switching arrangements for batteries. These have been unsatisfactory for many reasons and entirely unsuitable for the smaller home type of battery chargers capable of charging either six or 12 volt batteries. Such prior systems have been intricate and involved a great number of parts, were expensive and cumbersome and needed external power supplies for activating the protecting system, and did not always give the instantaneous protection required in the event of reversed polarity connection.

Accordingly, it is a major object of the invention to provide an automatic polarity changer for battery charging systems which substantially eliminates the disadvantages hereinabove encountered, as well as others, in the use of heretofore available systems.

A principal object of the invention is to provide an automatic polarity changer of the character described which is especially suitable for incorporation into substantially all of the home-type battery chargers available and yet, which is equally suitable for use in the larger models of battery chargers presently used in garages, filling stations and the like.

A primary object of the invention is to provide an automatic polarity changer of the character described which includes a pair of circuits adapted to be connected between the output terminals of the battery charger and the battery to be charged, said circuits including an impulse latching relay, connected in parallel therewith, said impulse latching relay being energized to a position automatically and instantaneously connecting the battery charger and battery in correct polarity relationship where the operator has connected the charger and battery in reversed polarity relationship and which relay permits continuous supply of charging current to the battery where the operator has connected the charger and battery in proper polarity relationship.

Another object of the invention is to provide a polarity changer of the character described which includes switching means enabling the charging device selectively to be rendered non-charging so as to permit said latching relay instantaneously to be energized in the event of incorrect polarity connection of the charging device to the battery, said switching means thereafter being operable to energize the charger device and simultaneously deactivate the relay by short-circuiting same.

Other objects of the invention are to provide an automatic polarity changer which is capable of incorporation into existing battery chargers substantially universally, economically and readily; which is simple and economical to make and use; which utilizes a very limited number of movable components likely to break down or require repair; which is fool-proof and operates substantially instantaneously so that in the event the battery and battery charger are connected improperly, automatic polarity change occurs without possible damage to the battery charger and/or the battery or battery system in the case of alternator systems.

The foregoing and other objects of the invention will become apparent from the ensuing disclosure which includes a detailed description of a preferred form of the invention and a modified form thereof in conjunction with accompanying drawings. It is believed that minor variations in the circuit components and arrangements thereof may occur to the skilled artisan without departing from the scope or sacrificing any of the advantages thereof.

In the drawing wherein the same characters of reference are employed to identify the same or equivalent parts throughout the several figures thereof:

Figure 1:
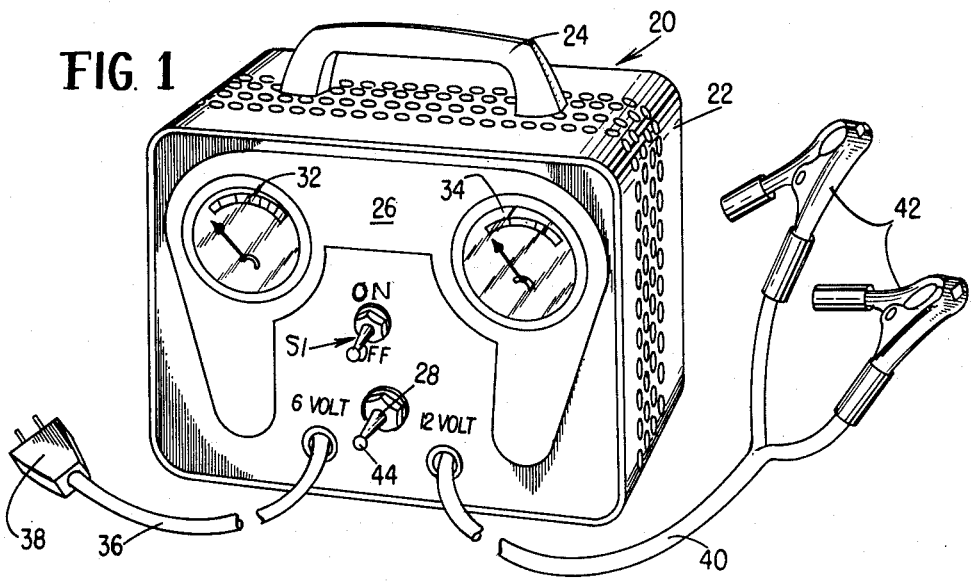
FIG. 1 is a front perspective view of a representative home-type battery charger having the automatic polarity changer system embodying the invention incorporated therein.

Referring now to the drawing, the reference character 20 in FIG. 1 identifies generally a representative portable battery charger available for so-called home use and in connection with which the invention is especially suitable, although not necessarily limited thereto. The ventilated case or housing 22 has a handle 24 for convenient transporting of the battery charger. The front instrument panel 26 carries a switch $S_1$ provided for turning the apparatus on and off, said switch $S_1$ also being a part of the polarity changer embodying the invention, as will be described in detail. The switch $S_1$ has two possible positions, namely, "off" or set and "on," which will be explained. A voltmeter 32 and ammeter 34 are provided in this model of charging instrument 20, although the ammeter and/or voltmeter may be omitted in some models manufactured. The instrument 20 is adapted to be connected into any conventional outlet for a suitable source of A.C. current by means of the electrical cord 36 having the male plug 38 at the end thereof. The electrical cord 40 has clips 42 for connection thereof to the upstanding terminals or posts of the conventional storage battery, for instance. In the instrument 20, there is provided a selector switch 44 for charging either six or twelve volt batteries.

It will be appreciated that instruments such as charger 20 may vary in considerable structural detail from that shown and illustrated. For purposes of this invention, it will be considered that a full-wave rectifier circuit is provided on the interior of case 22 which can be connected to a conventional source of A.C. electrical current to provide a direct current output which can be supplied to a battery through the clips 42. One of the clips 42 will represent the positive terminal and other of the clips will represent the negative terminal of the battery charger 20, and for proper connection or correct polarity, the positive charger terminal must be connected to the positive battery terminal so that direct current from the battery charger will pass through the battery in a direction opposite to the direction of current discharge from the battery. It is common to identify polarity of the respective clips 42 in some manner, such as by colored insulation on the leads thereto or any other well-known manner to assist in proper connection thereof to the battery terminals.

Figure 2:
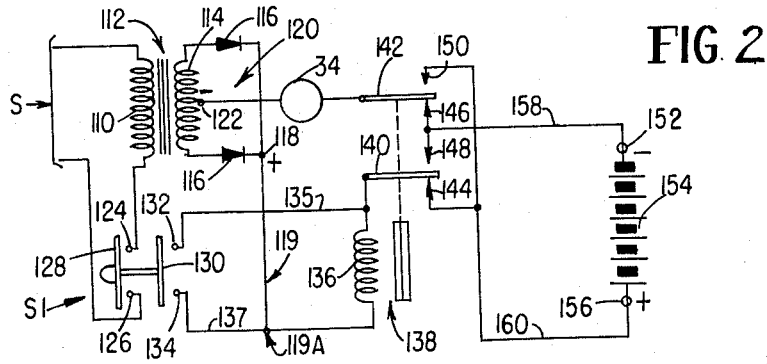
FIG. 2 is a circuit diagram of a battery charging system having a form of the preferred embodiment of the invention incorporated therein.

The preferred embodiment of the invention is shown in FIG. 2. The A.C. supply S is connected to the primary 110 of the transformer 112, the secondary 114 of which has its opposite terminals connected with suitable diodes 116 to a common terminal 118 which may be considered the positive terminal of the full-wave rectifier designated generally 120. The secondary winding 114 has a tap intermediate the ends thereof to provide the negative terminal 122 of the charger.

A single-throw, double pole switch $S_1$ controls the operation of the device between "off" and "on" positions thereof so designated for convenience of description. Two circuit loops are provided. The first loop comprises the primary circuit of the transformer 112 which is open at contact points 124 and 126 and adapted to be bridged by the armature 128. The second loop of switch $S_1$ consists of the armature 130 for bridging contacts 132 and 134 which are connected by means of leads 135 and 137 respectively in parallel with coil 136 of the relay 138.

The relay 138 is a double-pole, double-throw impulse latching relay which can be energized instantaneously whenever current flows through the coil thereof to reverse the two pairs of contacts associated therewith. Thus, relay 138 has two movable armatures 140 and 142 which are adapted to be moved in unison between one position electrically engaging the contacts 144 and 146 respectively, as seen in FIG. 2, and a second position engaging the other pair of contacts 148 and 150. Armature 142 is connected to the negative charger terminal 122 through the ammeter 34. Contacts 146 and 148 form one terminal 152 to which battery 154 is adapted to be connected. The other contacts 144 and 150 form the second terminal 156 to which the opposite battery terminal is connected. Terminal 152 is connected by lead 158 and through contact 146 and armature 142 to negative terminal 122. The positive charger terminal 118 is connected by lead 119 to junction 119a with lead 137. The terminal 156 of the battery is connected through lead 160 to contacts 144 and 150.

We consider now operation of the invention at both possible conditions of polarity connection. The clips 42 are connected to the posts or terminals of the battery 154 with switch $S_1$ in "off" or set position so that the contacts 124 and 126 are not bridged by armature 128. With contacts 124 and 126 open, the charging unit is deactivated. FIG. 2 represents the condition of proper connection of terminals for charging battery 154 after switch $S_1$ is moved to "on" position. Before switch $S_1$ is moved to said "on" position, negative charger terminal 122 is connected to the negative pole of the battery, presumed to be terminal 152 and the positive terminal 118 of the charging source is connected through coil 136 to the positive pole of the battery, presumed to be terminal 156. Negative terminal 122 will connect through armature 142, contact 146 and lead 158 to negative battery terminal 152. Positive charging terminal 118 will connect by lead 119 to junction 119a with lead 137, through coil 136, armature 140, contact 144 and through lead 160 to the positive terminal 156 of the battery. Thus, in this situation, when the clips 42 had been connected to the battery terminals in proper polarity relationship when switch $S_1$ was "off," the impulse relay 138 was not energized. Upon moving switch $S_1$ to "on" position, the charging apparatus was properly connected to charge battery 154.

We now consider the situation where the improper polarity terminal connections have been made when clips 42 are connected to the battery terminals while switch $S_1$ is in "off" position. The contacts 124 and 126 will be open thereby deactivating the charging unit. Where the chargers and battery terminals are improperly connected, terminal 156 will be considered the negative battery terminal and terminal 152 will be considered the positive terminal. The surge of current from the battery from terminal 156 will pass through lead 160, contact 144, armature 140, the coil 136, to juncture 119a. Since contacts 132 and 134 are open, current will flow through lead 119 to positive terminal 118, through the rectifiers, and back to the positive terminal 152 through ammeter 34, armature 142, contact 146 and lead 158. The relay will thereby instantly be energized to switch armature 140 to contact 148 and armature 142 to contact 150, thereby reversing the polarity of the connection of the battery terminals relative to the charger terminals. There is an instantaneous sensing of the polarity connection made so that when switch $S_1$ is moved to "on" position bridging contacts 132 and 134, the impulse latching relay is short-circuited and does not interfere with the supply of charging current from the charging apparatus.

It will be appreciated that no matter in what polarity relationship the charging terminals initially are connected to the battery terminals when switch $S_1$ is "off," charging of the battery will take place when switch $S_1$ is moved to "on". Where the proper polarity connection is made, charging will continue since the impulse latching relay will complete the circuit to the battery. Where incorrect polarity connection is made, the instantaneous surge of current from the battery is utilized to energize the impulse latching relay automatically to bridge the proper contacts of the switch arrangement so that correct polarity connection of the charging source with the battery automatically is achieved prior to switch $S_1$ being moved from its set position to "on". Thus, the invention makes it possible to achieve a proper connection of the charger instrument and battery regardless of the manner in which the terminals of the charging instrument are connected to the terminals of the storage battery initially. It is contemplated that a bi-stable switching relay will be suitable for achieving these desired functions, the exact structure of which may assume various forms in actual practice.

It will be seen that in connection with FIG. 2, the only part of major expense in the entire polarity changer circuit is the impulse latching relay 138 which is obtainable as a single unit.

It is believed that the invention has been described in sufficient detail to enable understanding and practice thereof by the skilled artisan. The claims hereto appended are intended to be broadly and liberally construed commensurate with the scope of the invention.

I claim:

1. An electrical battery charger apparatus comprising, a rectifier circuit having means for connecting the circuit to an A.C. current source and a pair of charger terminals adapted to be connected in random polarity to the terminals of the battery for supplying charging current thereto, and an automatic polarity changer circuit connected between the charger terminals and the rectifier circuit which includes a bi-stable switching relay operable to establish the connection of the terminals of the charger and battery respectively at the proper polarity regardless of the polarity of the initial connection thereof without requiring any external power source.

2. Apparatus as described in claim 1 in which said polarity changer circuit comprises a circuit loop adapted to be connected between each charger and battery terminal and said relay is connected in series with the battery to be energized therefrom, and means are provided for by-passing the relay when the condition of proper polarity connection of said terminals obtains.

3. Apparatus as described in claim 1 in which said polarity changer circuit comprises a circuit loop adapted to be connected between each charger and battery terminal and said relay is connected in series with the battery to be energized therefrom, and switch means are connected across the relay for selectively activating said charging apparatus and de-activating said relay after the condition of proper polarity connection is achieved.

4. Apparatus as described in claim 1 in which means are provided for by-passing the relay when the condition of proper polarity connection of said terminals obtains comprising switching means connected in parallel with said relay.

5. In an electrical battery charger apparatus having a rectification circuit adapted to be connected to an A.C. current source and a pair of charger terminals adapted to be connected in random polarity to the posts of the battery for supplying direct charging current thereto, an automatic polarity changer system adapted to be connected between said charger terminals and the system, said system including an impulse latching relay, a pair of circuit loops connected between said charger terminals and system including said latching relay, said relay connected in series with the battery to be charged and adapted to be energized to maintain the supply of current at the proper polarity by means of current from the battery.

6. A system as described in claim 5 in which means are connected with said relay for directing said battery current therethrough only when the initial connection of said terminals and posts is at incorrect polarity.

7. A system as described in claim 6 in which said means comprises a switching device connected in parallel with the relay.

8. A system as described in claim 7 in which said switching device has a pair of contacts connected in the primary circuit of the transformer of said system and adapted to be opened during initial connection of the terminals and posts to permit energization of the relay at said incorrect polarity condition.

9. A system as described in claim 5 in which switch means are connected across the relay for selectively activating the apparatus and de-activating the relay after the condition of proper polarity is achieved.

References Cited in the file of this patent

UNITED STATES PATENTS

| | | |
|---|---|---|
| 2,067,420 | Seeger et al. | Jan. 12, 1937 |
| 2,509,239 | Mattheyses | May 30, 1950 |
| 3,051,887 | Lind | Aug. 28, 1962 |